US012634613B2

(12) United States Patent
Doughty

(10) Patent No.: US 12,634,613 B2
(45) Date of Patent: May 19, 2026

(54) FLOCKED EARBUD TIP AND COVER

(71) Applicant: Dune Holdings LLC, Tucson, AZ (US)

(72) Inventor: Luke Doughty, Tucson, AZ (US)

(73) Assignee: Brya LLC, Tucson, AZ (US)

( * ) Notice: Subject to any disclaimer, the term of this patent is extended or adjusted under 35 U.S.C. 154(b) by 315 days.

(21) Appl. No.: 18/468,108

(22) Filed: Sep. 15, 2023

(65) Prior Publication Data

US 2024/0114278 A1 Apr. 4, 2024

Related U.S. Application Data

(60) Provisional application No. 63/411,984, filed on Sep. 30, 2022.

(51) Int. Cl.
*H04R 1/10* (2026.01)

(52) U.S. Cl.
CPC ......... *H04R 1/1016* (2013.01); *H04R 1/1058* (2013.01)

(58) Field of Classification Search
CPC ...... H04R 1/10; H04R 1/1016; H04R 25/652; H04R 25/656; H04R 25/658; H04R 2225/77
See application file for complete search history.

(56) References Cited

U.S. PATENT DOCUMENTS

| | | | | |
|---|---|---|---|---|
| 5,449,865 A * | 9/1995 | Desnick | A61B 7/02 | 181/135 |
| 8,280,093 B2 * | 10/2012 | Siahaan | H04R 1/1016 | 381/382 |
| 8,600,096 B2 * | 12/2013 | Lin | A61F 11/08 | 381/328 |
| 10,506,326 B2 * | 12/2019 | Prevoir | H04R 1/1091 | |
| 2006/0067524 A1 | 3/2006 | Smith et al. | | |
| 2007/0036383 A1 * | 2/2007 | Romero | H04R 1/1016 | 381/370 |
| 2016/0261945 A1 | 9/2016 | Kurtz et al. | | |
| 2018/0124489 A1 * | 5/2018 | Aljuwayed | H04R 1/1058 | |

(Continued)

FOREIGN PATENT DOCUMENTS

| | | | |
|---|---|---|---|
| CN | 201194429 Y | * | 2/2009 |
| CN | 204559847 U | * | 8/2015 |
| CN | 210351540 U | * | 4/2020 |

(Continued)

OTHER PUBLICATIONS

Schnier Elektrostatik GmbH, "Basics of Flocking" [online], published on May 7, 2021 [retrieved on Sep. 23, 2025]. Retrieved from the Internet <URL: schnier-flock.de/media/pages/produkte/flockgeraete/mini-flocker-evo-set/6e5c3191db-1680249302/basics-of-flocking.pdf> (Year: 2021).*

(Continued)

*Primary Examiner* — Ryan Robinson
(74) *Attorney, Agent, or Firm* — Hovey Williams LLP

(57) ABSTRACT

Flocked earbud tips for in-ear headphones are provided that exhibit superior grip and durability relative to conventional earbud tips. More particularly, the flocked earbud tips have at least one surface coated with flocked fibers, which can facilitate the grip and better hold the earbud tips within the ear canal of a user. The flocked earbud tips can function as replacement earbud tips for in-ear headphones or as covers for hard earbud tips of in-ear headphones.

20 Claims, 8 Drawing Sheets

(56) References Cited

U.S. PATENT DOCUMENTS

| | | | |
|---|---|---|---|
| 2020/0059716 | A1 | 2/2020 | Prevoir et al. |
| 2021/0084402 | A1 | 3/2021 | Terlizzi et al. |

FOREIGN PATENT DOCUMENTS

| | | | | | |
|---|---|---|---|---|---|
| JP | 2009049841 | A | * | 3/2009 | |
| JP | 3220710 | U | * | 3/2019 | |
| WO | WO-2024075106 | A1 | * | 4/2024 | ............... D06Q 1/14 |

OTHER PUBLICATIONS

International Search Report and Written Opinion for PCT Application No. PCT/US23/74326 (Dated May 1, 2024).
Invitation to Pay Additional Fees and, Where Applicable Protest Fee for PCT Application No. PCT/US2023/074326 (Nov. 1, 2024).

* cited by examiner

FLOCKED EARBUD TIP AND COVER

RELATED APPLICATIONS

This application claims the priority benefit under 35 U.S.C. § 119(e) of U.S. Provisional Patent Application Ser. No. 63/411,984 entitled "EARBUD COVER," filed Sep. 30, 2022, the entire disclosure of which is incorporated herein by reference.

BACKGROUND

1. Field of the Invention

The present disclosure generally relates to flocked earbud tips and covers for headphones. More particularly, the present disclosure generally relates to flocked replacement earbud tips and covers for in-ear headphones.

2. Description of the Related Art

In-ear headphones are becoming increasingly common in today's market because of their ability to be used in a vast array of activities. However, users encounter numerous wear issues involving in-ear headphones, particularly when the user is engaging in physical exercise (e.g., running, walking, lifting, etc.). Furthermore, even common daily activities, such as eating, have been known to dislodge in-ear headphones from the ear canals of users.

To address this issue, many manufacturers have offered replacement earbud tips for in-ear headphones made from memory foam or silicone, in an attempt to provide more grip within the ear canal of the user. Unfortunately, these tips and covers still struggle to stay within the ear canal of users during physical activities. Furthermore, these new tips exhibit poor durability and, in the case of memory foam, poor resistance to water.

Thus, there is still a need for improved earbud tips and covers for in-ear headphones.

SUMMARY

One or more embodiments of the present disclosure generally relate to a flocked earbud tip for an in-ear headphone. Generally, the flocked earbud tip comprises a main body with an exterior surface and an interior surface, wherein the flocked earbud tip is configured to fit into an ear canal of a user, and wherein the exterior surface is at least partially coated with a plurality of flocked fibers.

One or more embodiments of the present disclosure generally relate to a flocked earbud tip for an in-ear headphone. Generally, the flocked earbud tip comprises a main body with an exterior surface and an interior surface and the flocked earbud tip is configured to fit into an ear canal of a user. Furthermore, the exterior surface is at least partially coated with a plurality of flocked fibers, wherein the flocked fibers have an average length of less than 0.7 mm and are formed from a polyamide, a polyester, regenerated cellulose, cotton, or combinations of two or more thereof. Additionally, the main body is formed from a material exhibiting a Shore A hardness of less than 50.

One or more embodiments of the present disclosure generally relate to a method for forming a flocked earbud tip for an in-ear headphone. Generally, the method comprises: (a) providing an earbud tip configured to fit into an ear canal of a user; (b) applying an adhesive on at least a portion of a surface of the earbud tip to thereby form an adhesive-covered earbud tip; and (c) flocking a plurality of fibers onto at least a portion of the adhesive-covered earbud tip to thereby form the flocked earbud tip.

BRIEF DESCRIPTION OF THE FIGURES

Embodiments of the present invention are described herein with reference to the following drawing figures, wherein.

DETAILED DESCRIPTION

Figure 1:
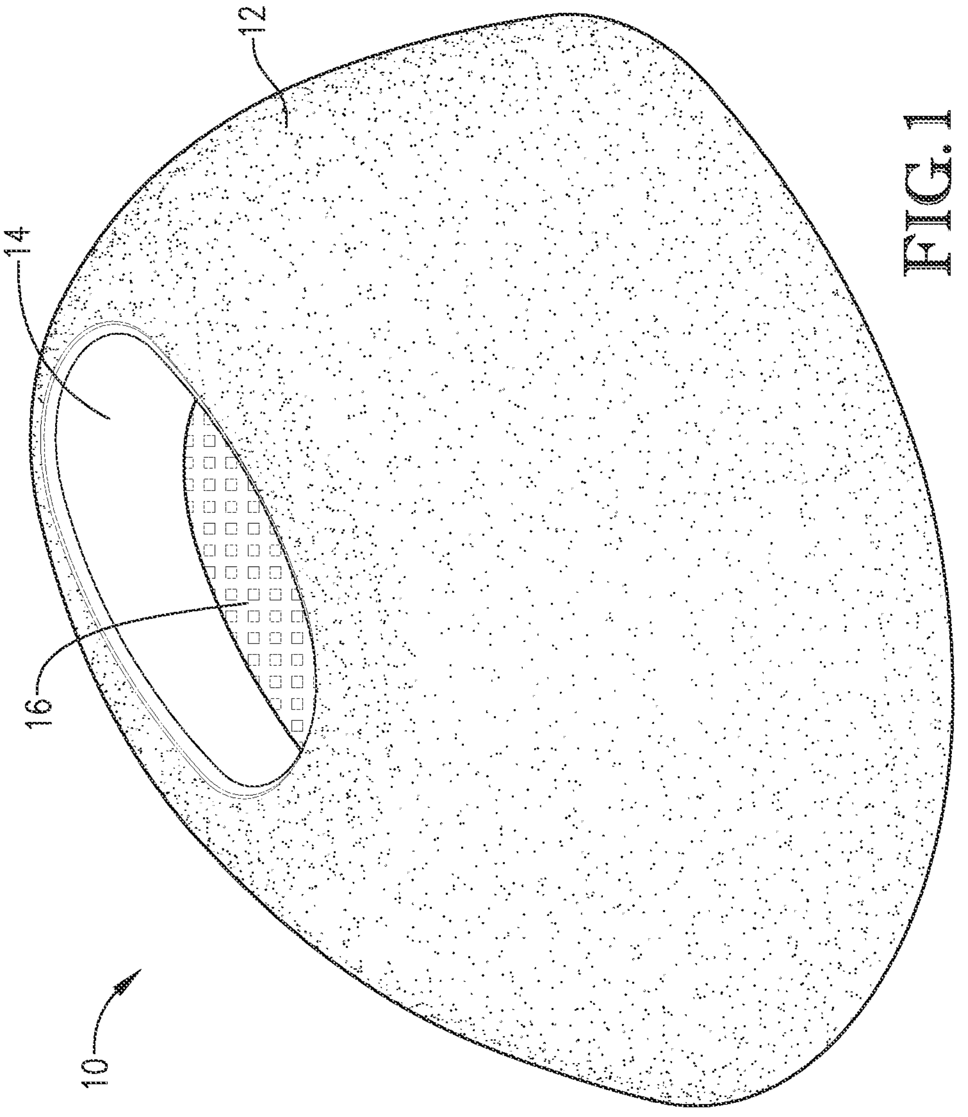
FIG. 1 depicts a flocked earbud tip according to one exemplary embodiment of the present disclosure.

It has been discovered that flocking earbud tips and covers with short fibers can form flocked earbud tips that exhibit superior properties relative to conventional earbud tips. More particularly, by applying flocked fibers on the surface of an earbud tip, including a cover for an earbud tip, superior flocked earbud tips may be formed that exhibit superior performance properties and durability.

As discussed below in greater detail, the process for producing the flocked earbud tips may involve: (a) providing an earbud tip configured to fit into an ear canal of a user; (b) applying an adhesive on at least a portion of a surface of the earbud tip to thereby formed an adhesive-covered earbud tip; and (c) flocking a plurality of fibers onto at least a portion of the adhesive-covered earbud tip to thereby form the flocked earbud tip.

Generally, the flocked earbud tips of the present disclosure may be in the form of replacement earbud tips for in-ear headphones or earbud tip covers configured to fit over an existing hard earbud of in-ear headphones. In embodiments where the flocked earbud tips function as earbud tip replacements, the flocked earbud tips may be attached to existing in-ear headphones by removing the original earbud tip from the in-ear headphones and directly attaching the flocked earbud tips to the in-ear headphones. In such embodiments, the flocked earbud tips may have the same or similar shape to the original earbud tip that it is replacing. Alternatively, in embodiments where the flocked earbud tips function as earbud tip covers, the flocked earbud tips may be placed over the existing hard earbud tip of the in-ear headphones. Thus, this will permit the flocked earbud tips to come into direct contact with the ear canals of the users when in use.

Turning to the process for producing the flocked earbud tips, the process begins by providing an earbud tip base. The earbud tip base may be produced via injection molding and may be configured to function as a replacement earbud tip or a cover for in-ear headphones with non-flexible hard tips.

Ideally, the earbud tip is made from a material that is flockable and compatible with flocking adhesives. Furthermore, it is desirable that the material not become deformed during the curing step of the flocking process. In one or more embodiments, the main body of the earbud tip may be formed from a thermoplastic elastomer, a thermoplastic vulcanizate (e.g., EPDM particles in a PP matrix), or a combination thereof. In various embodiments, the main body of the earbud tip may be formed from silicone, foam, latex, polyester (e.g., PET), polyurethane, polyolefin (e.g., PE or PP), an elastomer (e.g., ABS), or a combination of two or more thereof. In certain embodiments, the main body of the earbud tip may be formed from silicone, foam, or latex.

Additionally, or in the alternative, in one or more embodiments, the main body of the earbud tip may be formed from a material exhibiting a Shore A hardness of at least 5, 10, 15, 20, 25, or 30 and/or less than 100, 90, 80, 70, 60, 50, 45, or 40.

Before applying the adhesive onto the earbud tip, one may optionally pretreat the selected surfaces of the earbud tip that will be flocked. This optional pretreatment can make the treated surfaces of the earbud tip more susceptible to flocking. In one or more embodiments, at least a portion of one or more surfaces of the earbud tip may be pretreated prior to applying an adhesive onto the earbud tip. Exemplary pretreatments can include, for example, plasma treatment, priming, flaming, corona oxidation, sand blasting, scarification, or fluorinating.

In certain embodiments, at least a portion of one or more surfaces of the earbud tip may be pretreated with a primer. In such embodiments, at least one primer may be applied to at least a portion of one or more surfaces of the earbud tip. Generally, the primer roughs up the surface of the earbud tip, thereby making it more susceptible to flocking. In various embodiments, the primer can comprise an organic solvent, such as a xylene-containing solvent. An exemplary primer is Chemlok® 459X from Parker Hannifan.

Additionally, or in the alternative, prior to applying the adhesive, spacers and/or masking applications may be added to the earbud tip so as to maintain the integrity of the earbud tip during flocking and/or mask certain surfaces of the earbud tip that one doesn't want to be covered in flocked fibers. Spacers may be added to the earbud tip to maintain the integrity and structure of the earbud tip during flocking. Exemplary spacers can include, for example, disposable foam, cover trim, cover foam, or any other material known in the art that can maintain the integrity of the earbud tip during flocking.

The application of the flocked fibers onto the exterior surface and interior surface of the earbud tip may be controlled using masking applications (e.g., masking tape). This can prevent the application of flocked fibers on certain surfaces of the earbud tips that may come in to contact with certain sensitive areas within the ear canal of the user. For example, a masking application may be applied to the exterior surface in the area near where the inner tube begins so as to avoid applying flocked fibers on the very tip of the earbud tips.

After the optional pretreatment, the optional spacing step, and/or the optional masking step, at least one adhesive may be applied to at least a portion of one or more surfaces of the earbud tip. The adhesive may be applied by spraying, rolling, brushing, dipping, pad printing, or screen printing. The formed adhesive layer is configured to hold the flocked fibers in place.

In various embodiments, the adhesive may be a hot melt adhesive. In one or more embodiments, the adhesive may be water-based or organic solvent-based.

In one or more embodiments, the adhesive comprises an acrylic-containing adhesive, a polyurethane-containing adhesive, a vinyl acetate-containing adhesive, or a combination of two or more thereof. In certain embodiments, the adhesive comprises a polyurethane adhesive, such as Flocklok® 851 from Parker Hannifan.

In one or more embodiments, the adhesive may comprise a cross-linking agent, such as an epoxy.

Generally, the adhesives should be applied in as uniform a layer thickness as possible. In certain embodiments, a layer thickness of the dried adhesive of about 1 to 30, 5 to 15, or about 10 percent of the average flock fiber length is desired. This ensures that the fibers are optimally anchored in the adhesive and can withstand stress.

Consequently, the application of the adhesives results in the formation of an adhesive layer on one or more of the surfaces of the earbud tip. In one or more embodiments, the thickness of the adhesive layer, measured as a dry film, corresponds to at least 1, 5, or 10 percent and/or less than 50, 45, 40, 35, 30, 25, 20, or 15 percent of the average flocking fiber length.

In one or more embodiments, the thickness of the adhesive layer, measured as a dry film, is at least 1, 2, 3, 4, or 5 mils and/or less than 25, 20, 15, 10, 9, 8, 7, or 6 mils.

Generally, the time between application of the adhesive and flocking should be as short as possible, so that the adhesive does not dry before the fibers are incorporated in sufficient density. The so-called "open time" of the adhesive depends on the adhesive and is specified in the manufacturer's processing instructions.

Subsequently, during the adhesive's open time, the flocking step may occur. During the flocking step, a plurality of flocking fibers may be flocked onto at least a portion of the adhesive-covered surfaces. Generally, the flocking techniques can be electrostatic flocking or electrostatic-pneumatic flocking. In one or more embodiments, the flocking is carried out via a manual applicator, a flocking chamber unit, an electrostatic-pneumatic flocking machine, or a flocking chamber with an extraction unit.

In one or more embodiments, the flocking technique is electrostatic flocking. Electrostatic flocking is a textile technology that employs a Coulombic driving force to launch short fibers from a charging source towards an adhesive-covered surface, resulting in a dense array of aligned fibers perpendicular to the surface. More specifically, electrostatic flocking utilizes an electric charge to orient fibers and promote their perpendicular alignment. During this method, the adhesive-coated surface passes through a high voltage electrostatic field and an electrode is utilized to give the flock fiber a charge. The charged fibers become aligned with the electric field lines of force and are attracted to a grounded electrode. The flock moves towards the adhesive-coated surface and becomes embedded. Fibers are adhered perpendicular to the surface, thereby giving a dense, pile finish. The electrostatic flocking method can be enhanced with pneumatic techniques for good coverage on three-dimensional objects.

In one or more embodiments, the electrostatic flocking can be carried out with a handheld electrostatic flocker with an air blower to evenly coat the flock fibers on the earbud tip. The handheld units generally comprise a metal plate, a generator, and a flocking head. The metal plate must be grounded. The generator creates the electrostatic charge and may be wired to a canister that contains the loose flock fibers. A metal screen may be mounted halfway inside the canister opening. The open end of the canister is then passed over the adhesive-coated surface, drawing flock fibers from the canister through the screen. The electrostatic charge propels the fibers toward the grounded metal plate. The adhesive-coated surface intercepts the fibers and flocking occurs. As discussed further below, the flocked surface may then be cured, and the loose fibers may be removed.

Moreover, electrostatic flocking enables a high density of flocked fibers on the treated surfaces because the fibers are able to stand vertically due to the electricity orienting the fibers. Flock density, or the number of fibers in a given area, can be controlled by several factors during electrostatic flocking. While not wishing to be bound by theory, flock fiber density may increase positively with the amount of time an electric field is present and with the mass of fibers loaded onto the charged surface. Thus, flock density can be controlled by adjusting the electric field intensity, and/or by changing the mass of loaded flock fibers.

Fiber density can be calculated based on the following formula: $FD=n_f/A_f$, where "FD" is the fiber density, "$n_f$" is the number of fibers in the field view, and "$A_f$" is the surface area of the field view. Flock fiber density can be measured using simple microscopic imaging and counting. In one or more embodiments, the flocked surfaces of the flocked earbud tips have a flocked fiber density of at least 5, 10, 15, 20, 25, 30, 35, 40, 45, 50, 55, 60, 65, 70, 75, 80, 85, 90, 95, 100, 105, 110, 115, 120, 125, 130, 135, 140, 145, or 150 and/or less than 500, 450, 400, 350, 300, 250, 200, 175, or 160 fibers/$mm^2$.

In one or more embodiments, at least 10, 15, 20, 25, 30, 35, 40, 45, 50, 55, 60, 65, 70, 75, 80, 85, 90, 95, or 99 percent of the exterior surface of the earbud tip has a flocked fiber density of at least 5, 10, 15, 20, 25, 30, 35, 40, 45, 50, 55, 60, 65, 70, 75, 80, 85, 90, 95, 100, 105, 110, 115, 120, 125, 130, 135, 140, 145, or 150 and/or less than 500, 450, 400, 350, 300, 250, 200, 175, or 160 fibers/$mm^2$.

Maintaining a controlled atmosphere for flocking can also be important. Generally, the flocking area should have a relative humidity of about 60 percent and a temperature of 20 to 25° C. A small variation in temperature or a change in the percentage of relative humidity can result in a 3 to 4 factor change in the conductivity or electrical sensitivity of the flock fiber and the substrate. If not properly maintained, these changes may have an adverse effect on the flocking process, and may result in flock balling, reduced adhesion, and density of the flocking.

The flocked fibers may be formed from any material that is capable of being flocked. In one or more embodiments, the flocked fibers are formed from a polyamide (Nylon 6/6, Nylon 6/66, etc.), a polyester (e.g., PET), an acrylic, a regenerated cellulose (e.g., rayon), cotton, a polyolefin (e.g., PP), silk, or a combination of two or more thereof.

In one or more embodiments, the flocked fibers have an average length of at least 0.05, 0.1, 0.15, 0.2, 0.25, 0.3, or 0.35 mm and/or less than 3.0, 2.5, 2.0, 1.5, 1.0, 0.9, 0.8, 0.7, 0.6, 0.5, or 0.4 mm. Additionally, or in the alternative, in various embodiments, the flocked fibers may have an average denier of at least 0.1, 0.2, 0.3, 0.4, 0.5, 0.6, 0.7, or 0.8 and/or less than 2.0, 1.9, 1.8, 1.7, 1.6, 1.5, 1.4, 1.3, 1.2, 1.1, 1.0, or 0.9. Additionally, or in the alternative, in other embodiments, the flocked fibers may have an average diameter of at least 1, 2, 3, 4, 5, 6, 7, 8, 9, 10, 11, 12, 13, 14, 15, 16, 17, 18, 19, or 20 microns and/or less than 100, 75, 50, 45, 40, 35, 30, 25, 20, 19, 18, 17, 16, or 15 microns.

The flocked fibers may have any cross-sectional shape, such as round, lobed, square, or ribbon. In certain embodiments, the flocked fibers have a round cross-sectional shape.

Subsequent to the flocking step, at least a portion of the flocked earbud tip may be subjected to curing in order to effectively cure the adhesive and adhere the flocked fibers thereon. In one or more embodiments, the curing comprises heating at least a portion of the flocked earbud tip for a predetermined amount of time. The heating can occur in a drying cabinet or a dryer (e.g., a continuous flow dryer or oven). Generally, the heating and drying conditions are specific to the adhesive that is used.

In one or more embodiments, the curing occurs at a temperature of at least 20, 25, 30, 35, 40, 45, 50, 55, 60, 65, 70, 75, 80, 85, 95, 100, 105, 110, 115, 120, 125, 130, 135, 140, or 145° C. Additionally, or in the alternative, the curing may occur at a temperature of less than 300, 250, 200, 190, 180, 170, 160, 150, 140, 130, 120, 110, 100, 90, 80, 70, 60, 50, or 40° C. Additionally, or in the alternative, in various embodiments, the curing may occur over a time period of at least 1, 2, 3, 4, 5, 6, 7, 8, 9, or 10 minutes and/or less than 60, 50, 40, 30, 20, or 15 minutes.

After the curing step, at least a portion of the excess and loose flocked fibers may be removed from the flocked earbud tip. These removal techniques can include, for example, suction, beating, brushing, and/or washing. In one or more embodiments, the removal technique can involve spraying the flocked earbud tips with compressed gas, such as compressed air, to remove loose fibers therefrom.

Optionally, after curing and/or removal of excess fibers, the flocked earbud tips may be coated with a protective coating. For example, at least a portion of the flocked earbud tip may be coated with an oleophobic and/or hydrophobic coating. The coating may be applied via dip coating, spraying coating, and/or brush coating. In certain embodiments, the coating comprises a fluorosilicone.

Due to the flocking process described herein, the exterior surface of the flocked earbud tips, which are configured to contact the ear canal of the user, can be substantially flocked. In one or more embodiments, at least 10, 15, 20, 25, 30, 35, 40, 45, 50, 55, 60, 65, 70, 75, 80, 85, 90, 95, or 99 percent of the exterior surface of the earbud tip is covered with the flocked fibers, based on the total surface area of the exterior surface. Additionally, or in the alternative, less than 99, 95, 90, 85, 80, 75, or 70 percent of the exterior surface of the earbud tip may be covered with the flocked fibers, based on the total surface area of the exterior surface.

In one or more embodiments, at least 10, 15, 20, 25, 30, 35, 40, 45, 50, 55, 60, 65, 70, 75, 80, 85, 90, 95, or 99 percent of the interior surface of the earbud tip is covered with the flocked fibers, based on the total surface area of the interior surface. Additionally, or in the alternative, less than 99, 95, 90, 85, 80, 75, or 70 percent of the interior surface of the earbud tip may be covered with the flocked fibers, based on the total surface area of the interior surface.

Due to the use of spacers and/or masking applications as discussed above, the interior space of the flocked earbud tips may have very little flocked surfaces. In one or more embodiments, less than 99, 90, 80, 70, 60, 50, 40, 30, 20, 10, or 5 percent of the interior surface of the earbud tip is covered with the flocked fibers, based on the total surface area of the interior surface.

Exemplary embodiments of the flocked earbud tips are provided in FIGS. 1-8.

Figure 2:
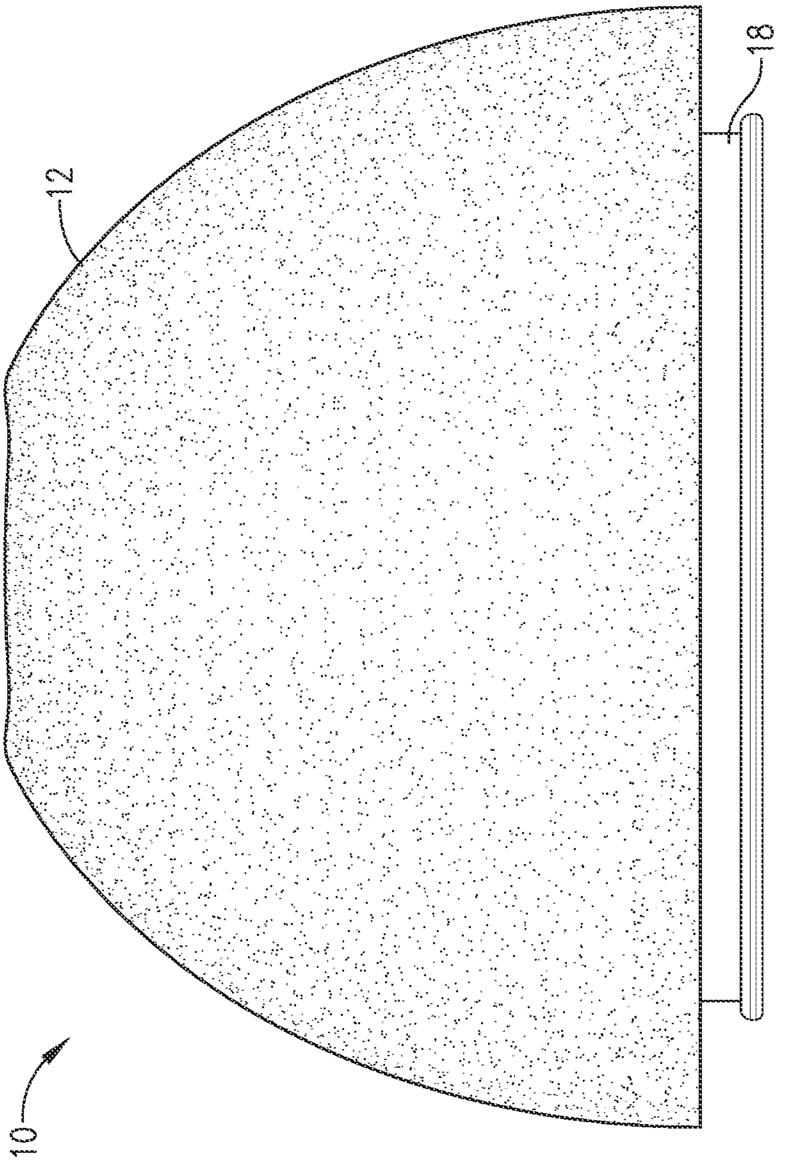
FIG. 2 provides a side view of the exemplary flocked earbud tip of FIG. 1.
Figure 3:
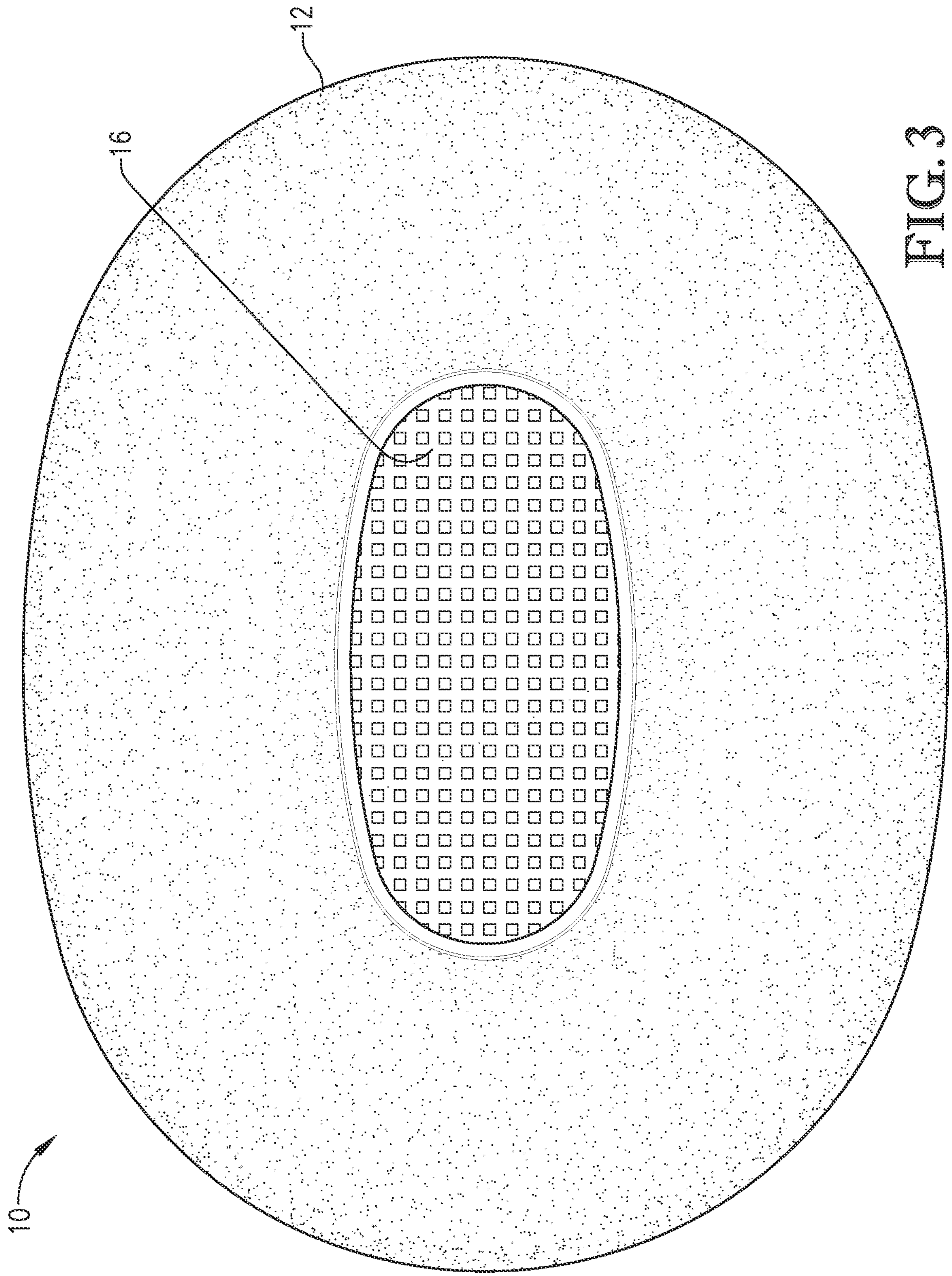
FIG. 3 provides a top view of the exemplary flocked earbud tip of FIG. 1.
Figure 4:
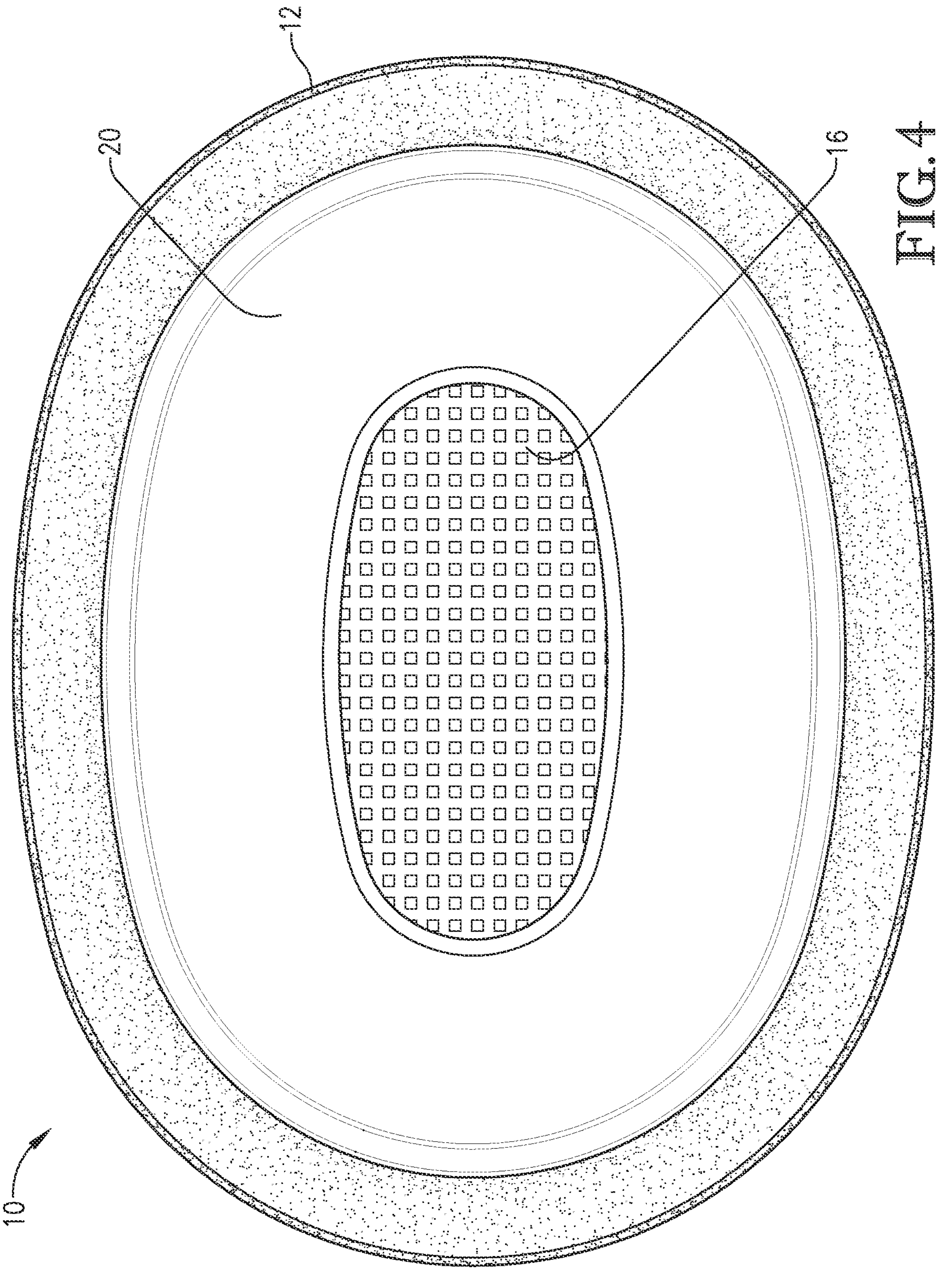
FIG. 4 provides a bottom view of the exemplary flocked earbud tip of FIG. 1.

FIGS. 1-4 depict an exemplary flocked earbud tip that may be used as a replacement earbud tip for Apple® AirPods Pro® Generation 1 and 2. As shown in FIG. 1, the flocked earbud tip 10 may comprise a main body with a flocked exterior surface 12 and an inner tube 14 leading to a sound mesh barrier 16. The exterior surface 12 of the main body is generally the portion of the flocked earbud tip that will contact the ear canal of the user. Although not depicted as being flocked in FIG. 1, the inner tube 14 may be flocked with flocked fibers utilizing the flocking method described herein. As shown in FIG. 2, the flocked earbud tip 10 may comprise a base 18, which can be configured to attach to the desired in-ear headphone. FIG. 3 provides a top view of the flocked earbud tip and demonstrates how the sound mesh barrier 16 is preferably left unflocked, so as to avoid clogging the mesh barrier 16. As discussed above, a spacer and/or masking application may be applied to the mesh screen barrier 16 during the flocking process to prevent flocking of this membrane. FIG. 4 provides a bottom view of the flocked earbud tip 10 and demonstrates how the exterior surface 12 may be flocked, while the interior surface 20 of the main body may be unflocked to mitigate costs.

In one or more embodiments, at least 10, 15, 20, 25, 30, 35, 40, 45, 50, 55, 60, 65, 70, 75, 80, 85, 90, 95, or 99 percent of the surfaces (exterior surface and/or interior surface) of the inner tube are covered with the flocked fibers, based on the total surface area of the surfaces. Additionally, or in the alternative, less than 99, 95, 90, 85, 80, 75, or 70 percent of the surfaces (exterior surface and/or interior surface) of the inner tube may be covered with the flocked fibers, based on the total surface area of the surfaces.

Figure 5:
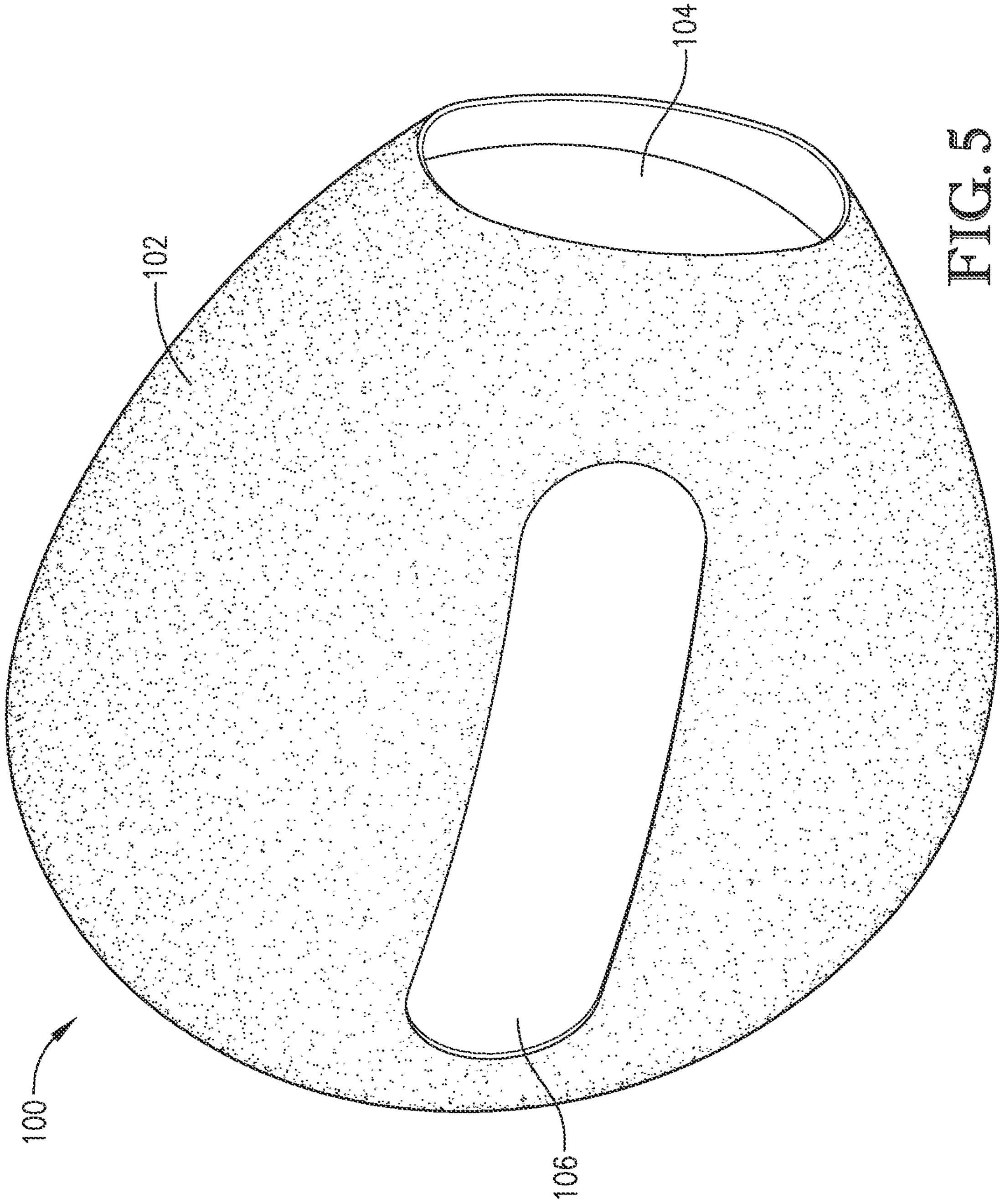
FIG. 5 depicts a flocked earbud tip cover according to one exemplary embodiment of the present disclosure.
Figure 6:
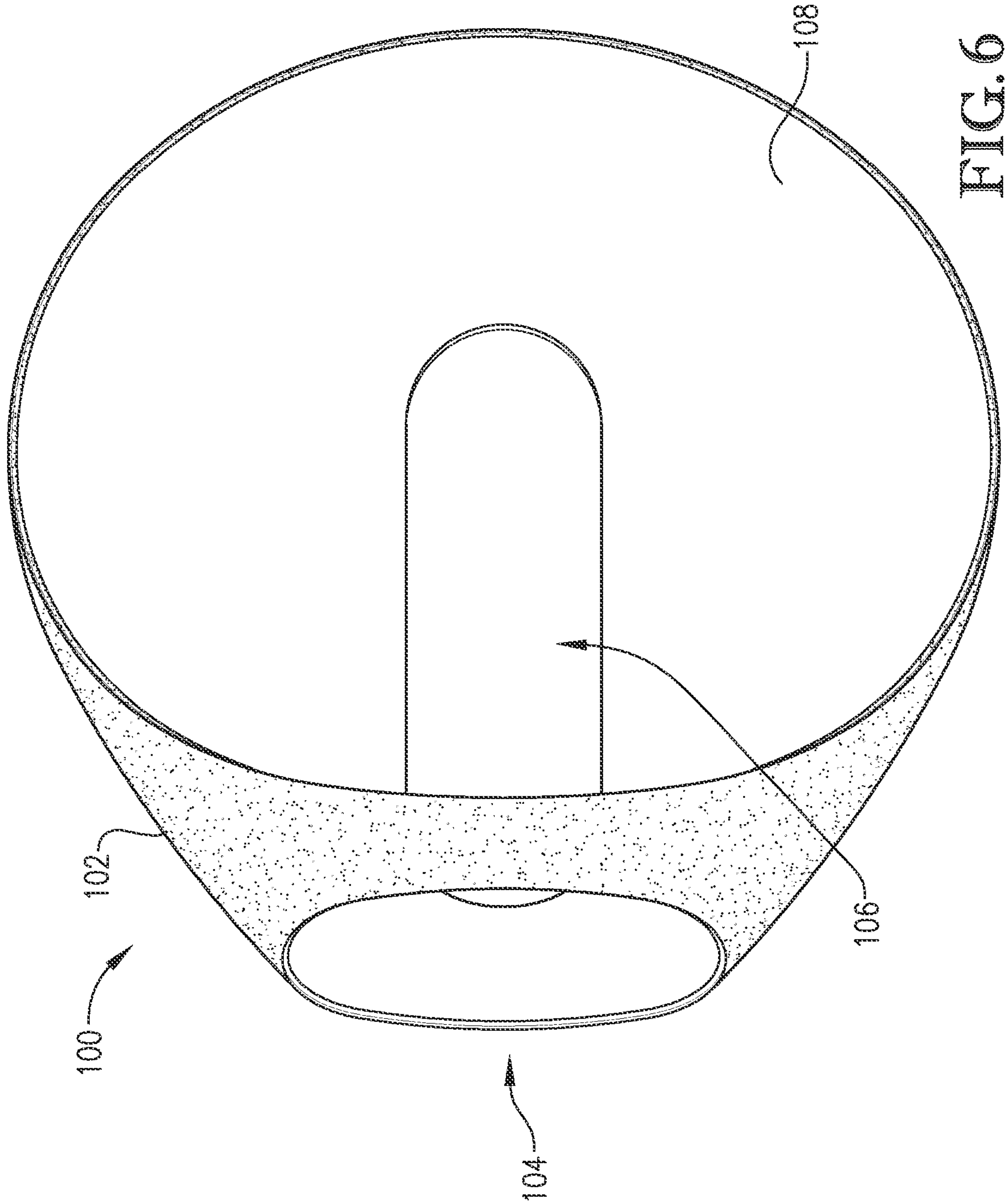
FIG. 6 provides a bottom view of the exemplary flocked earbud tip cover of FIG. 5.

FIGS. 5 and 6 depict an exemplary flocked earbud tip cover 100 according to various embodiments of the present disclosure, which may function as a cover for Apple® AirPods® Generations 1 and 2. As shown in FIGS. 5 and 6, the flocked earbud tip cover 100 may comprise a flocked exterior surface 102 of the main body, which his configured to contact the ear canal of the user. Furthermore, the flocked earbud tip cover 100 may comprise apertures 104, 106 designed to facilitate the sound channels of the in-ear headphone. As shown in FIG. 6, the interior surface 108 of the main body of the flocked earbud tip cover 100 may be unflocked.

Figure 7:
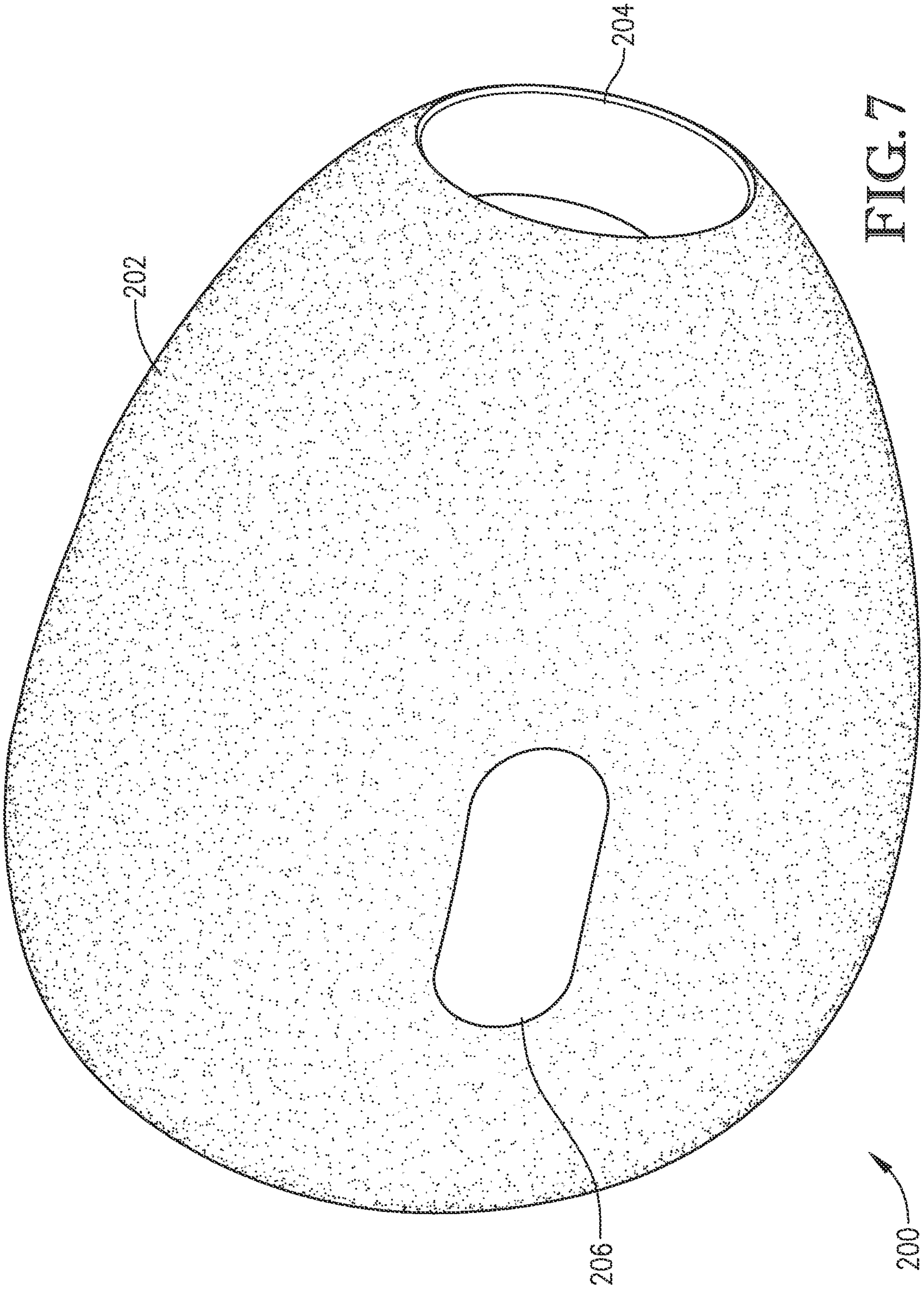
FIG. 7 depicts a flocked earbud tip cover according to one exemplary embodiment of the present disclosure.
Figure 8:
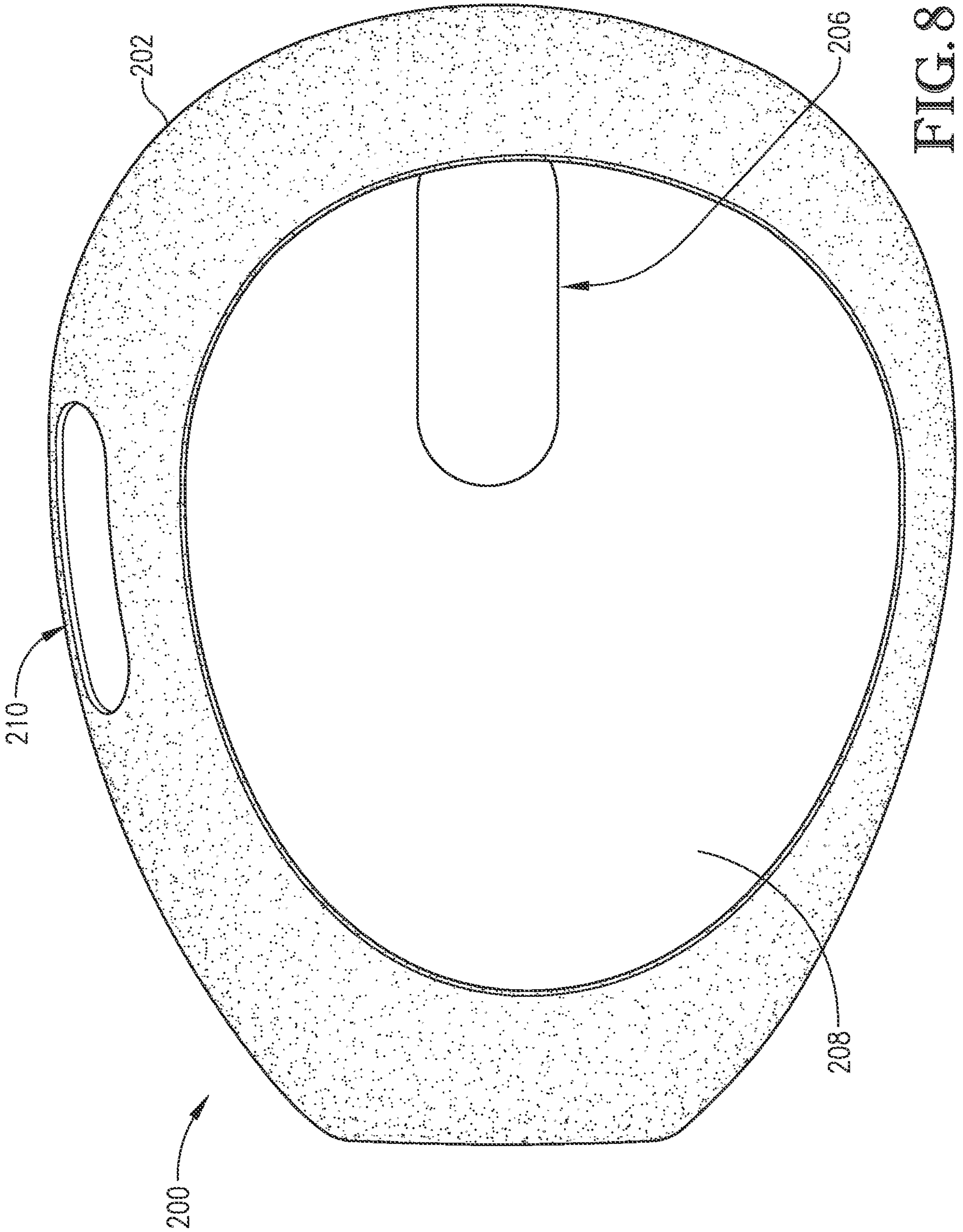
FIG. 8 provides a bottom view of the exemplary flocked earbud tip cover of FIG. 7.

FIGS. 7 and 8 depict an exemplary flocked earbud tip cover 200 according to various embodiments of the present disclosure, which may function as a cover for Apple® AirPods® Generation 3. As shown in FIGS. 7 and 8, the flocked earbud tip cover 200 may comprise a flocked exterior surface 202 of the main body, which is configured to contact the ear canal of the user. Furthermore, the flocked earbud tip cover 200 may comprise apertures 204, 206, and 210 designed to facilitate the sound channels of the in-ear headphone. As shown in FIG. 8, the interior surface 208 of the main body of the flocked earbud tip cover 200 may be unflocked.

Although FIGS. 1-8 depict specific embodiments of the flocked earbud tips of the present disclosure, one skilled in the art would readily appreciate that the flocked earbud tips may be configured to be utilized with a variety of audio and digital devices, including a variety of different in-ear headphones.

The flocked earbud tips disclosed herein may exhibit numerous improvements relative to conventional earbud tips that are currently available. For example, due to the presence of the flocked fibers on the exterior surface of the earbud tips, the grip of the earbud tips within the ear canal may be increased. While not wishing to be bound by theory, it is believed that the flocked fibers increase the surface area of the earbud tips, thereby increasing the frictional interactions between the earbud tip and the ear canal, which increases the grip of the earbud tip. This increased grip is even more notable when the earbud tips are wet, such as caused by sweating. In contrast, conventional silicone and foam earbud tips generally exhibit poor water and sweat resistance. When conventional foam and silicone earbud tips are wet, such as from sweat, they facilitate the formation of a slippery layer between the earbud tip and the ear canal, which causes the earbud tip to become dislodged from the ear canal. In contrast, the flocked earbud tips of the present disclosure are able to mitigate the formation of such slippery layers due to the presence of the short-flocked fibers. Consequently, the flocked earbud tips of the present disclosure are better able to maintain and hold an audio device (e.g., in-ear headphones) within the ear canal of a user.

Furthermore, the flocked earbud tips of the present disclosure may exhibit superior durability compared to conventional earbud tips, such as those made from foam. Foam earbud tips generally lose their ability to expand within the ear canal due to continuous compressing and decompressing during use. In contrast, the flocked fibers do not exhibit these same deficiencies after repeated use. Generally, the durability of the flocked earbud tips can be linked to the adhesives used to form the flocked fiber layers. As long as the adhesive layer is maintained, the flocked earbud tips may be used without any effect on their performance.

Additionally, due to the layer of flocked fibers, the earbud tips of the present disclosure may be more sanitary than conventional earbud tips. While not wishing to be bound by theory, it is believed that the flocked fibers provide a surface that is easier to clean, particularly relative to foam earbud tips. With foam earbud tips, bacteria can get deep within the foam, thereby making such tips very difficult to clean. In contrast, the flocked fibers of the present earbud tips are easier to clean and do not facilitate the propagation and growth of bacteria. Ideally, in various embodiments, the flocked fibers are applied to the surface areas of the earbud tip that may come into contact with the ear wax of the user. Due to the characteristics of the flocked surfaces, they are easier to clean and remove ear wax therefrom.

Another benefit of the flocked earbud tips of the present disclosure is that they can provide superior audio quality, particularly when compared to foam earbud tips. Unlike foam, which tends to absorb sound, the flocked earbud tips may facilitate sound transmissions into the ear canals of the user by retaining a good grip within the ear canal.

Definitions

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "include," and "included" have the same open-ended meaning as "comprising," "comprises," and "comprise" provided above.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

Claims not Limited to Disclosed Embodiments

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A flocked earbud tip for an in-ear headphone comprising a main body with an exterior surface and an interior surface, wherein the flocked earbud tip is configured to fit into an ear canal of a user, wherein the exterior surface is at least partially coated with a plurality of flocked fibers having an average length of less than 0.4 mm, and wherein the flocked earbud tip is coated with an oleophobic and hydrophobic coating.

2. The flocked earbud tip according to claim 1, wherein the flocked earbud tip is configured to replace an existing earbud tip on an in-ear headphone.

3. The flocked earbud tip according to claim 1, wherein the flocked earbud tip is configured to cover an existing earbud tip on an in-ear headphone.

4. The flocked earbud tip according to claim 1, wherein the flocked fibers have an average denier of less than 1.6.

5. The flocked earbud tip according to claim 4, wherein the main body is formed from a material exhibiting a Shore A hardness of less than 50.

6. The flocked earbud tip according to claim 5, wherein an adhesive layer covers at least a portion of the exterior surface, wherein the adhesive layer has a thickness corresponding to at least 1 percent and less than 50 percent of the average length of the flocking fiber.

7. A flocked earbud tip for an in-ear headphone comprising a main body with an exterior surface and an interior surface, wherein the flocked earbud tip is configured to fit into an ear canal of a user, wherein the exterior surface is at least partially coated with a plurality of flocked fibers, wherein the flocked fibers have an average length of less than 0.4 mm and are formed from a polyamide, a polyester, regenerated cellulose, cotton, or combinations of two or more thereof, wherein the main body is formed from a material exhibiting a Shore A hardness of less than 50, and wherein the flocked earbud tip is coated with an oleophobic and hydrophobic coating.

8. The flocked earbud tip according to claim 7, wherein the flocked earbud tip is configured to replace an existing earbud tip on an in-ear headphone.

9. The flocked earbud tip according to claim 7, wherein the flocked earbud tip is configured to cover an existing earbud tip on an in-ear headphone.

10. The flocked earbud tip according to claim 8, wherein the flocked fibers have an average denier of less than 1.2.

11. The flocked earbud tip according to claim 10, wherein an adhesive layer covers at least a portion of the exterior surface, wherein the adhesive layer has a thickness corresponding to at least 1 percent and less than 50 percent of the average length of the flocking fiber.

12. A method for forming a flocked earbud tip for an in-ear headphone, the method comprising:

(a) providing an earbud tip configured to fit into an ear canal of a user;

(b) applying an adhesive on at least a portion of a surface of the earbud tip to thereby form an adhesive-covered earbud tip;

(c) flocking a plurality of fibers onto at least a portion of the adhesive-covered earbud tip to thereby form the flocked earbud tip, wherein the fibers have an average length of less than 0.4 mm; and (d) applying an oleophobic and hydrophobic coating on the flocked earbud tip after the flocking.

13. The method according to claim 12, wherein the flocking comprises electrostatic flocking.

14. The method according to claim 13, further comprising curing the flocked earbud tip after the flocking of step (c) to thereby cure the adhesive.

15. The method according to claim 12, further comprising, prior to the applying of step (b), pretreating at least a portion of the earbud tip.

16. The method according to claim 12, wherein the fibers have an average denier of less than 1.2.

17. The method according to claim 16, wherein the fibers are formed from a polyamide, a polyester, regenerated cellulose, cotton, or combinations of two or more thereof.

18. The flocked earbud tip according to claim 1, wherein the oleophobic and hydrophobic coating comprises a fluorosilicone.

19. The flocked earbud tip according to claim 7, wherein the oleophobic and hydrophobic coating comprises a fluorosilicone.

20. The method according to claim 12, wherein the oleophobic and hydrophobic coating comprises a fluorosilicone.

* * * * *